(12) United States Patent
Foster

(10) Patent No.: US 7,707,119 B2
(45) Date of Patent: Apr. 27, 2010

(54) SYSTEM AND METHOD FOR IDENTITY PROTECTED SECURED PURCHASING

(75) Inventor: Frederick D. Foster, Philadelphia, PA (US)

(73) Assignee: Frederick Foster

( * ) Notice: Subject to any disclaimer, the term of this patent is extended or adjusted under 35 U.S.C. 154(b) by 139 days.

(21) Appl. No.: 11/455,619

(22) Filed: Jun. 19, 2006

(65) Prior Publication Data

US 2007/0011103 A1    Jan. 11, 2007

Related U.S. Application Data

(60) Provisional application No. 60/692,146, filed on Jun. 19, 2005.

(51) Int. Cl.
*G06Q 20/00* (2006.01)

(52) U.S. Cl. .............. 705/67; 705/64; 705/50; 705/51

(58) Field of Classification Search ............ 705/67, 705/64, 50, 51
See application file for complete search history.

(56) References Cited

U.S. PATENT DOCUMENTS 7,069,249 B2 * 6/2006 Stolfo et al. .............. 705/74
2002/0062342 A1 * 5/2002 Sidles .............. 709/203
2003/0218065 A1 * 11/2003 Viswanathan .............. 235/449
2003/0221125 A1 * 11/2003 Rolfe .............. 713/201
2005/0038714 A1 * 2/2005 Bonet et al. .............. 705/26
2008/0059263 A1 * 3/2008 Stroman et al. .............. 705/7
2008/0306877 A1 * 12/2008 Mandeles et al. .............. 705/76
2009/0259560 A1 * 10/2009 Bachenheimer .............. 705/26

* cited by examiner

*Primary Examiner*—Pierre E Elisca

(57) ABSTRACT

A system and method to enable a person to interact in both a physical world and an electronic world and enable a person to make Identity Protected Secured Purchases (IPSP) is described. The system includes a blank card containing an encoded strip, a password, a wireless communication device (cell phone with two-way satellite communication), and a server that delivers purchase approvals. The assigned blank card contains encoded information exclusive to the client that when presented, allows the retailer to request purchase approval from the server. The password is a series of numbers known only by the client. The assigned wireless communication device transmits its EIN (exclusive to the client) to the server and allows the client to input their password. The server includes a matching process that matches information from the client's blank card, password and, wireless communication device with information from retailers and other hosts that warrant the purchase approval. In the method, the client's identity is never exposed to the retailer. The client simply takes their receipt, the validation server authorizes the transaction and records it and the validation server keeps a record of the purchase.

16 Claims, 3 Drawing Sheets

SYSTEM AND METHOD FOR IDENTITY PROTECTED SECURED PURCHASING

CROSS REFERENCE TO RELATED APPLICATION

This application claims the benefit of U.S. Provisional Patent Application No. 60/692,146, filed Jun. 19, 2005, the entirety of which is hereby incorporated by reference into this application.

BACKGROUND OF THE INVENTION

1. Field of the Invention

The present invention relates to secure purchasing using credit in which a blank card containing information and a wireless communication device are coordinated with a validation server to provide a secured transaction.

2. Description of Related Art

Conventional credit card and debit card payment systems provide cashless payment for goods and services at points of purchase by use of a credit or debit card. The identity of the purchaser is shown on the front of the credit and/or debit card and a signature of the purchaser is provided on the back of the credit and/or debit card. It is often difficult for a merchant to determine from the signature if the purchaser presenting the credit and/or debit card is attempting to make a fraudulent transaction.

U.S. Pat. No. 7,014,107 describes a transaction method for secure payment by credit cards or debit cards for goods or services with the use or mobile devices. The payment authorization center delivers a public portion of the authorization token to the service provider via the existing communication channels and the private portion of the authorization token is delivered to the mobile device via SMS or USSD or e-mail short message. The mobile device delivers the private authorization token to the service provider via a private local network based on bluetooth, infrared or other short radio frequency based technology. The credit card or debit card number is never revealed and a temporary card token replaces it. This method is cumbersome and the response time is slow for approval.

It is desirable to provide an expeditions system and method for identity protected secured purchasing.

SUMMARY OF THE INVENTION

A system and method to enable a person to interact in both a physical world and an electronic world and enable a person to make Identity Protected Secured Purchases (IPSP) is described. The system includes a blank card containing an encoded strip, a password, a wireless communication device (cell phone with two-way satellite communication), and a server that delivers purchase approvals. The assigned blank card contains encoded information exclusive to the client that when presented, allows the retailer to request purchase approval from the server. The password is a series of numbers known only by the client. The assigned wireless communication device transmits its electronic identification number (exclusive to the client) to the server and allows the client to input their password. The server includes a matching process that matches information from the client's blank card, password and, wireless communication device with information from retailers and other hosts that warrant the purchase approval. In the method, the client's identity is never exposed to the retailer. The client simply takes their receipt, the validation server authorizes the transaction and records it and the validation server keeps a record of the purchase.

The invention will be more fully described by reference to the following drawings.

DETAILED DESCRIPTION

Figure 1:
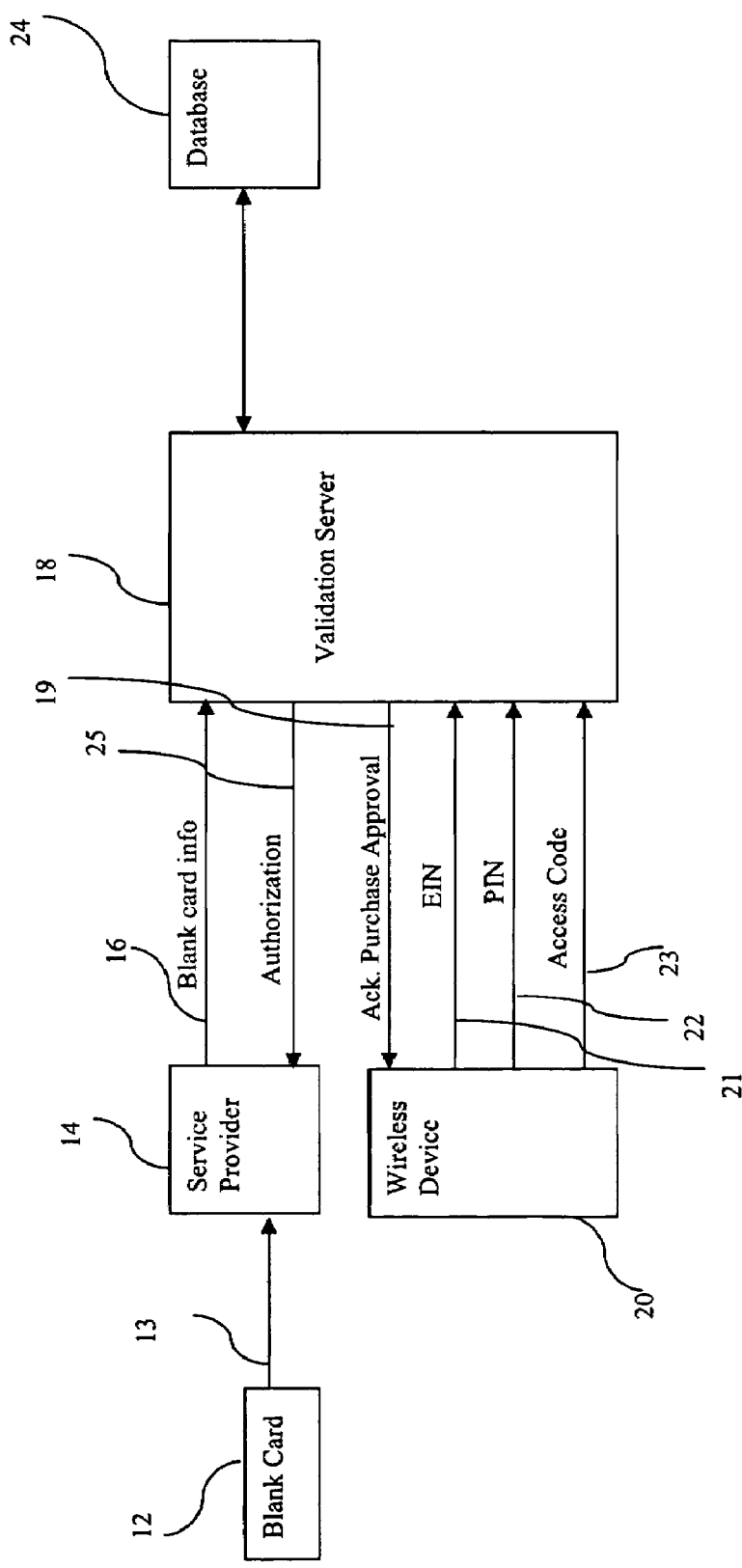
FIG. 1 is a schematic diagram of a system of a system for identity protected secured purchasing.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a system for identity protected secured purchasing 10 in accordance with the teachings of the present invention. System 10 includes blank card 12 which is used by a purchaser. Blank card 12 includes encoded information of the purchaser on a magnetic strip or internal chip. For example, the information of the purchaser can include a wireless device number, identity information and credit card information. Blank card 12 can also include a blank card identification, identification of a financial institution, indicia of the financial institution and return address. Blank card 12 is presented at interface 13 at service provider 14 to allow a retailer at service provider 14 to request purchase approval from validation server 18. For example, interface 13 can be a card reader for reading blank card 12.

Blank card information 16 received at service provider 14 is forwarded electronically to validation server 18. For example, service provider 14 can be a server at a retailer location.

Validation server 18 generates a connection to wireless device 20 for sending an acknowledgement of a purchase approval request 19. Wireless device 20 can be a cellular phone including two-way satellite capability.

The user of blank card 12 chooses or is assigned an access code for each one of their accounts and chooses or is assigned a password. Upon establishment of a call between validation server 18 and wireless device 20, a user of wireless device 20 is prompted to enter additional confirmations needed to approve the financial transaction. Server 18 receives and can validate a unique electronic identification number 21 of wireless device 20. A user of wireless device 20 can enter PIN 22 at wireless device 20. Alternatively, PIN 22 can be a password. A user of wireless device 20 can enter an access code 23 at wireless device 20. For example, access code for a debit account may be in the form of a three-digit number, i.e., 555 and an access code for a credit card account may be in the form of a three digit number, i.e., 666.

Validation server 18 includes a matching process to match blank card information 16, electronic identification number 21, PIN 22 and access code 23 with stored information and information from databases 24 to determine if the purchase is approved. If the purchase is approved, validation server 18 forwards positive authorization 25 to service provider 14 indicating that the purchase has been authorized. If the purchase is not approved, validation server 18 forwards negative authorization 26 indicating that the purchase was denied. The purchase information can be recorded and stored at validation server 18. In the method, the client's identity is never exposed to the retailer. The client simply takes their receipt, validation server 18 authorizes the transaction and records it and validation server 18 keeps a record of the purchase.

Figure 2:
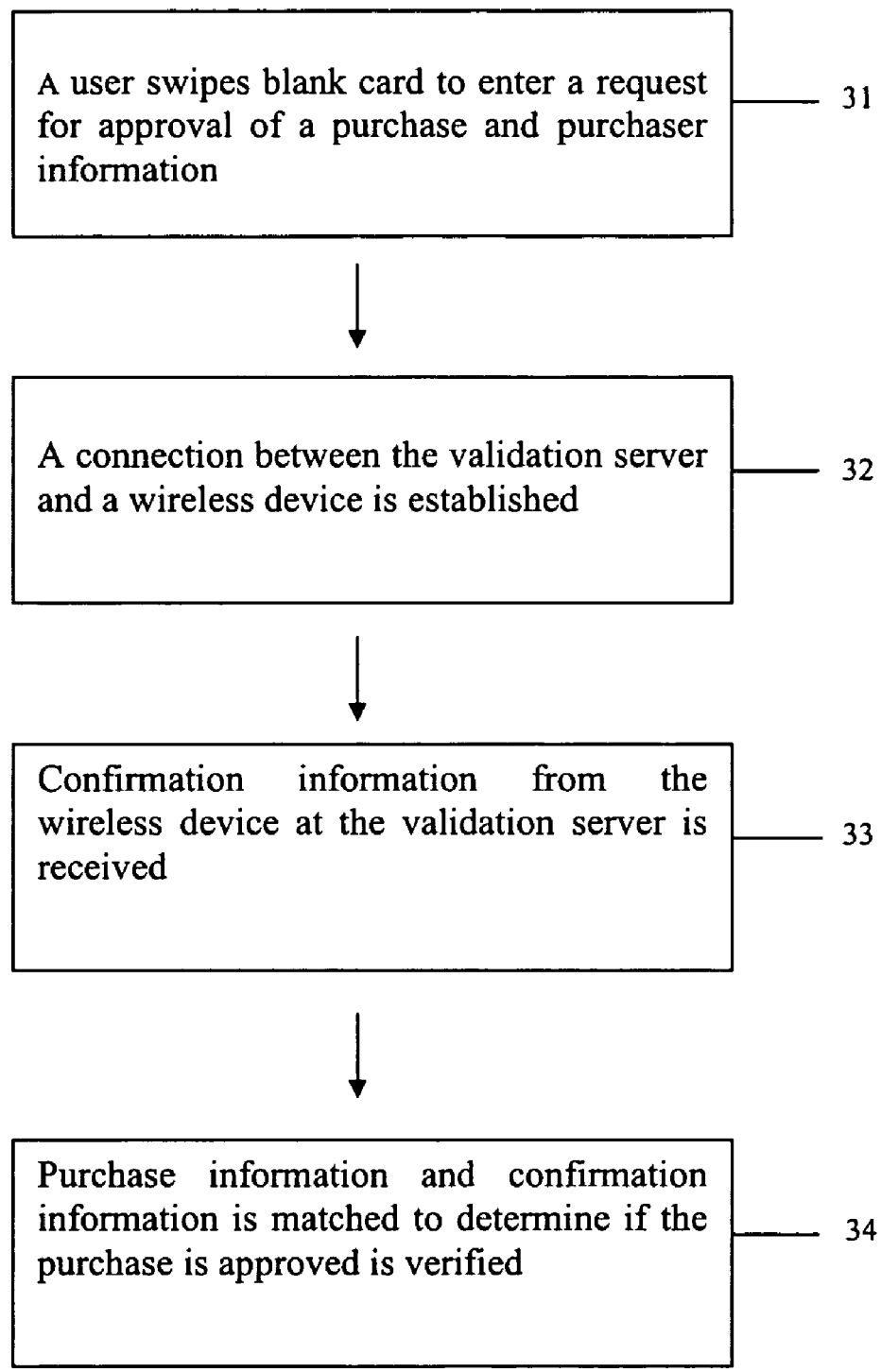
FIG. 2 is a flow diagram of a method for identity protected secured purchasing.

FIG. 2 is a flow diagram of a method for identity protected secured purchasing 30. In block 31, a user swipes blank card 12 to enter a request for approval of a purchase and purchaser information. The request for approval is transmitted to validation server 18 in block 32. In block 32, a connection between validation server 18 and a wireless device is established. In block 33, confirmation information from the wireless device at validation server 18 is received is received at the validation server. In block 34, purchaser information and confirmation information is matched with information at validation server 18 or other databases to determine if the purchase is approved. In block 35, an indication is sent from validation server 18 to the service provider. The indication can be a positive authorization indicating that the purchase has been approved or a negative authorization indicating that the purchase has been denied.

Figure 3:
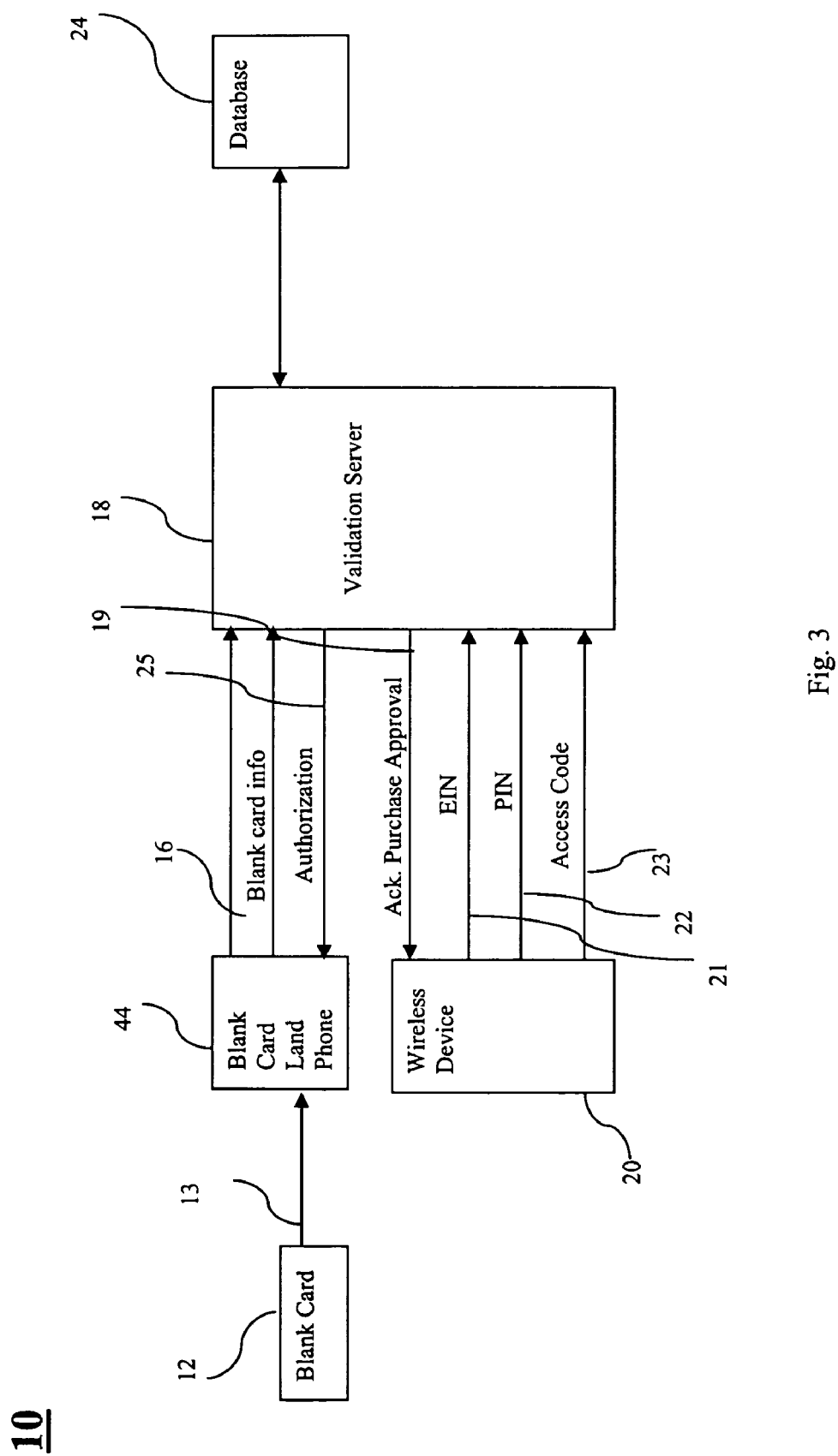
FIG. 3 us a schematic diagram of an alternate embodiment including a blank card land phone.

FIG. 3 illustrates an alternate embodiment including a blank card land phone 44. Blank card land phone 44 is a communication device combined with a card reader in one unit. Blank card land phone 44 can establish call 45 with validation server 18. For example, call 45 can be to a validation server at a billing entity, such as an operator for MCI or an MCI automated system. The user enters authorization request blank card information 16 from blank card 12, as in block 31. Authorization for the payment continues as described above in blocks 32-35. Blank card land phone 44 can be installed at a user's home, office or at various public places to create virtual identity protected secured purchasing payment centers. Blank card land phone 33 can provide validation server 18 with information concerning the transaction such as the client, date and time, product, retailer, cost and the like. The user can select at blank card land phone 44 the financial institution for which payment is to be made from, such as bank or credit companies.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method of identity protected secured purchasing comprising:
   unlocking the window to the IPSP System allowing the System to enter a request for approval of a purchase;
   entering purchaser's key (or token unique to purchaser) at a service provider said purchaser key is encoded on a blank card and said purchaser key is entered by swiping said blank card at a card reader at said service provider (reader only transmits key), said blank card includes visually, the IPSP/Blank Card logo and a logo and return address of a financial institution, electronically, the said blank card includes an encoded encryption, unique to the purchaser, and one or more of identification of a financial institution;
   transmitting the purchaser key and purchase information (service provider information, product or service information, and cost) to a validation server;
   establishing a connection between said validation server and a wireless device wherein wireless device may be at service provider location or at remote location (allowing for third party purchase);
   said validation server entering a request for approval of a purchase to said wireless device, at service provider location or at remote location (allowing for third party purchase);
   receiving confirmation information from said wireless device at said validation server;
   verifying said confirmation information to determine if said purchase is approved; and
   sending an indication and said confirmation to said service provider whether said purchase has been approved or denied.

2. The method of claim 1 wherein said confirmation information is a combination of an electronic identification number, password and access code.

3. The method of claim 1 wherein said confirmation information is an electronic identification number, password and access code and the purchase is approved if the electronic identification number, password and access code is verified.

4. The method of claim 1 wherein verification of said purchaser key, verification of the electronic identification number, verification of the password, verification of the access code, and receipt of the indication that the purchase has been approved are established before completion of said purchase.

5. The method of claim 1 wherein a credit card company or validation server performs the step of verifying the purchaser key and confirmation information.

6. A system for identity protected secured purchasing comprising:
   a blank card as means for entering purchaser key at a said service provider, said blank card includes visually the IPSP/Blank Card logo and a logo and return address of a financial institution, electronically, the said blank card includes an encoded encryption, unique to the purchaser, and one or more of identification of a financial institution;
   means for transmitting purchaser key to a validation server;
   means for establishing connection between validation server and a wireless device, at service provider location or at remote location (allowing for third party purchase);
   means for wireless device, at service provider location or at remote location (allowing for third party purchase) to receive purchase request from validation server;
   means for receiving confirmation information from said wireless device (at service provider location or at remote location) at said validation server;
   means for verifying said purchaser key and said confirmation information to determine if said purchase is approved or denied; and
   means for sending an indication to said service provider whether said purchase is approved or denied.

7. The system of claim 6 wherein said purchaser key is contained on a blank card and said means of entering said purchaser key comprises swiping said blank card at a card reader at a said service provider.

8. The system of claim 6 wherein said confirmation information is a combination of one or more of an electronic identification number, password and access code.

9. The system of claim 6 wherein said confirmation information is an electronic identification number, password and access code and the purchase is approved if the electronic identification number, password and access code is verified.

10. The system of claim 6 wherein verification of said purchaser key, verification of the electronic identification number, verification of the password, verification of the access code, and a receipt of the indication that the purchase has been approved are established before completion of said purchase.

11. A method for identity protected secured purchasing comprising:

blank card as means for entering purchaser key and purchase information (service provider information, product or service information, and cost) at a blank card land phone, said blank card includes visually the IPSP/Blank Card logo and a logo and return address of a financial institution, electronically, the said blank card includes an encoded encryption, unique to the purchaser, and one or more of identification of a financial institution;

a blank card as means for transmitting said purchaser key and said purchase information to a validation server;

means for establishing a connection between said validation server and a wireless device (at blank card land phone location or at remote location);

means for receiving confirmation information from said wireless device (at blank card land phone location or at remote location) at said validation server;

means for verifying said purchaser key and said confirmation information to determine if said purchase is approved; and means for sending an indication to said service provider whether said purchase has been approved or denied.

12. The method of claim 11 said purchaser key is contained on a blank card and said means for entering said purchaser key comprises swiping said blank card at reader at said blank card land phone.

13. The method of claim 11 wherein said confirmation Information is an electronic identification number, password and access code and the purchase is approved if the electronic identification number, password and access code is verified.

14. The method of claim 13 wherein verification of said purchaser key, verification of the electronic identification number, password and access code, and receipt of the indication that the purchase has been approved are established before completion of said purchase.

15. A system for identity protected secured purchasing comprising:

entering a purchaser key and purchase information (service provider information, product or service information, and cost) at a blank card land phone said purchaser key is entered by swiping said blank card at said blank card land phone, said blank card includes visually the IPSP/Blank Card logo and a logo and return address of a financial institution, electronically, the said blank card includes an encoded encryption, unique to the purchaser, and one or more of identification of a financial institution:

transmitting the purchaser key and purchase information to a validation server;

establishing a connection between the validation server and a wireless device (at blank card land phone location or at remote location);

receiving confirmation information from wireless device (at blank card land phone location or at remote location) at validation server;

verifying said purchaser key and said confirmation information to determine if the purchase is approved; and sending an indication to the service provider whether the purchase has been approved or denied.

16. The system of 15 wherein said confirmation information is the combination of an electronic identification number, password and access code is verified.

* * * * *